United States Patent [19]

Weissman et al.

[11] Patent Number: 5,438,028
[45] Date of Patent: Aug. 1, 1995

[54] METHOD OF ENHANCING FINISHED CATALYSTS

[75] Inventors: Jeffrey G. Weissman, Wappingers Falls; Elaine C. DeCanio, Montgomery; Thomas G. C. Nelson, Beacon; Denise C. Tebbens, Poughkeepsie, all of N.Y.

[73] Assignee: Texaco Inc., White Plains, N.Y.

[21] Appl. No.: 136,144

[22] Filed: Oct. 15, 1993

[51] Int. Cl.6 .................. B01J 21/02; B01J 27/06; B01J 27/138; B01J 27/132

[52] U.S. Cl. ................... 502/202; 502/203; 502/204; 502/205; 502/206; 502/224; 502/226; 502/228

[58] Field of Search ............... 502/25, 29, 33, 202, 502/203, 204, 205, 206, 224, 226, 228

[56] References Cited

U.S. PATENT DOCUMENTS

| | | | |
|---|---|---|---|
| 4,272,401 | 6/1981 | Mohan et al. | 502/25 |
| 4,309,278 | 1/1982 | Sawyer | 502/222 |
| 4,478,948 | 10/1984 | Rebsdat et al. | 502/33 |
| 4,485,183 | 11/1984 | Miller et al. | 502/25 |
| 5,154,819 | 10/1992 | Clark et al. | 502/25 |

*Primary Examiner*—Asok Pal
*Assistant Examiner*—E. D. Irzinski
*Attorney, Agent, or Firm*—George J. Darsa; Kenneth R. Priem; Cynthia L. Hunter

[57] ABSTRACT

A method of enhancing the activity of a catalyst for the hydroprocessing of hydrocarbons, comprising:
  (a) applying a modifying element dissolved in a solvent onto the surface of a finished catalyst;
  (b) drying said modified finished catalyst to remove all free solvent from said catalyst;
  (c) optionally, heating said dried, modified finished finished catalyst at a temperature of about 120° C. to about 1000° C. at a rate of 1°–20° C. per minute, and holding said dried catalyst at a temperature of about 120° C. to about 1000° C. up to 48 hours to provide an enhanced finished catalyst; and
  (d) recovering said enhanced finished catalyst.

6 Claims, 2 Drawing Sheets

☐ SULFUR REMOVAL ACTIVITY
▨ NITROGEN REMOVAL ACTIVITY

○ UNMODIFIED CATALYST
● 0.6 WT. % BORON MODIFIED CATALYST

○ UNMODIFIED CATALYST
● 0.6 WT. % BORON MODIFIED CATALYST

METHOD OF ENHANCING FINISHED CATALYSTS

BACKGROUND OF THE INVENTION

This invention relates to a process for modifying previously formed catalysts. The product is suitable for hydroprocessing of naphthas and gas oils. The process consists of incorporating boron or a similar element or compound onto a catalyst, and the product is found to have enhanced catalytic activity, as compared to an equivalent unmodified catalyst.

Hydrocarbon fuels are now being required to be produced with extremely low sulfur content, for example less than 0.05 wt % sulfur in diesel fuel, and 500 ppm sulfur or less in gasoline. To meet these requirements refineries have to hydroprocess naphthas and gas oils at higher temperatures and under more sever conditions. In order to maintain throughput and profitability, higher activity catalysts are required for these operations.

Thus, an object of this invention is to provide an inexpensive method of improving the activity of finished catalysts designed for the hydroprocessing of hydrocarbons.

DISCLOSURE STATEMENT

European Patent 0 297 949 discloses a catalyst composition containing boron and phosphorous in specific ratios, added after or during deposition of active metals, with boron added in non-aqueous solution; also requires a specific aging step after boron deposition and before final treatment to form a finished catalyst.

This reference does not disclose the addition of boron after the catalyst is formed, and requires the added complications of specific quantities of other elements and requires an aging step.

U.S. Pat. No. 4,139,492 discloses a method of compounding a catalysts by adding $HBF_4$ simultaneously with the a solution of the active metals. Our method adds boron only to finished catalysts and not during the preparation of catalysts, and so is more widely applicable.

An article of G. Murilidhar, F. E. Massoth, and J. Shabtai in Journal of Catalysis 85 44–52 (1984) describes modification of catalysts with boron. These were tested using thiophene model compound for hydrodesulfurization activity; the boron modified catalysts were significantly less active than the unmodified catalysts; as their methods and processes were not suitable.

European Patent Application, 922,201,500.3, discloses the use of boron added during the preparation of a Mo-W-Co-Ni-B/$Al_2O_3$ composition useful for simultaneous hydrotreating and hydrocracking of vacuum gas oils.

DETAILED DESCRIPTION OF THE INVENTION

Figure 1:
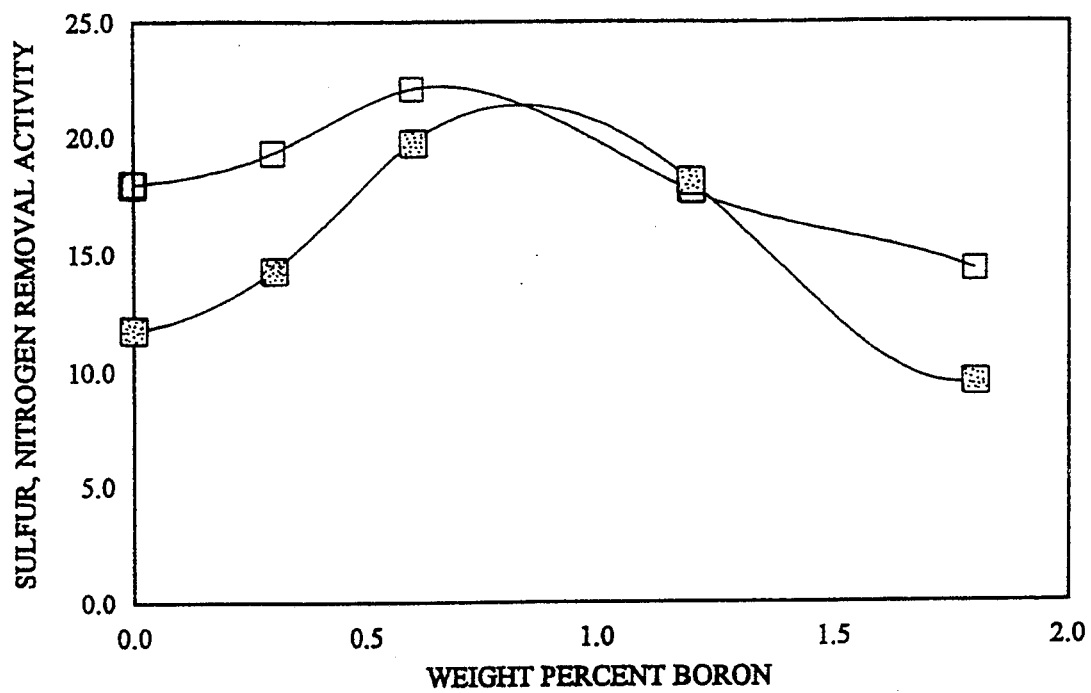
FIG. 1 illustrates the influence of the amount of boron added to a modified catalyst on the resulting sulfur and nitrogen removal activity.

Conventional hydroprocessing catalysts consist of several active metals, activity enhancers or other additives, and a support. As commonly practiced, the support is composed of a high surface area, high pore volume refractory oxide support, such as various aluminas; other supports commonly used or reported in prior art include silica, zeolites, titanias, and zirconias, and mixtures of these with each other or alumina; carbon has also been employed. Onto the support is dispersed an active metal, usually deposited as a metal salt, which is then normally converted to an oxide; the finished catalyst is then normally sulfided prior to utilization. Active metals include those of Groups VIB, VIIB, and VIII of the Periodic Table; however, only Ni, Co, Me, and W are commonly used. Other elements, acting as dispersing agents or activity enhancers, may also be employed, these include P.

Various methods have been reported in the prior art regarding means of improving hydrotreating catalyst activity. These almost exclusively involve methods of compounding the support, prior to finishing the support, or methods of compounding the catalyst prior to completing the finished product. These methods include introducing different elements having different functionalities during the support or catalyst preparation, often necessitating separate involved deposition and preparations steps, which then adds to the cost and time needed to prepare the finished catalyst. These methods cannot be applied to finished or preexisting catalysts, as they must be applied during the formation of the catalyst.

It has been found that catalyst activity can be improved by additives placed onto the catalyst after formation of the catalyst, This is advantageous as previously formed catalysts can be improved by this method. Also, this method is not restricted to catalyst manufacturing, but can be applied at the site of catalyst utilization, or by catalyst vendors or processors.

The modifier is placed onto the catalyst using several deposition methods, including equilibrium adsorption from solutions of salts or other soluble compounds, or incipient wetness impregnation of solutions containing the compounds, or other methods, such a deposition from a vapor phase or any other method resulting in an uniform distribution of the modifier on the catalyst.

One preferred technique of adding modifier to the catalyst is incipient wetness impregnation. The required amount of modifier is dissolved in a solvent, such as water, hydrogen peroxide solution, acetone, alcohols, or other convenient solvent, the volume of solvent corresponding to the pore volume capacity of the catalyst. This solution is placed onto the catalyst, assuring that all of the solution is placed evenly throughout the catalyst volume. In the case that the volume of solvent needed to dissolve the required amount of salt exceeds the pore volume of the catalyst, multiple impregnation steps can be undertaken, with intermediate drying steps.

After deposition a drying step is necessary to remove excess solvent, followed by an optional heat treatment step. A drying step involves removing all free solvent at mild conditions, such as from 20° to 120° C. for up to 16 hours, in an inert or oxygen containing atmosphere, and under vacuum or atmospheric pressure, or elevated pressures. The heat treatment step involves heating in an oxygen containing gas, such as air, at a sufficiently high temperature to remove all solvent and decompose the modifier salts. Such a step involves heating to 120° to 1000° C., at a rate of 1 to 20° C. per minute, and holding at from 120° to 1000° C. for up to 48 hours, and then cooling to room temperature, all under a flow of oxygen containing gas at a rate sufficient to remove reaction products arising from the decomposition of the metal salts.

According to the present invention, suitable modifying elements and compounds include those containing boron and fluorine, although other elements having compounds with similar properties can be employed, such as tin, arsenic, antimony, bismuth, chlorine, bromine, iodine, lithium, beryllium, sodium, potassium, rubidium, and cesium. Boron and boron containing compounds are preferred. Compounds such as the hydrated acids, ammoniacal salts, halides, and nitrates of these elements can be employed, examples of which include boric acid, $H_3BO_3$, boron fluoroboric, $BF_3$, or fluoboric acid, $HBF_4$, various boron fluorine hydrocarbon compounds of general formula $B_nF_mR_o$, or the oxygenated equivalents, n, m, and o being positive integers, n and o having values of at least 1, and m can be zero or greater, and where R can be a combination of hydrocarbons such as ethers, paraffins, aromatics or other ring compounds, amines, and so on, examples of which are boron fluorideether, $BF_3(C_2H_5)_2O$, boron tripropoxide, $B(OC_3H_2)_3$, triethylboron, $(C_2H_5)_3B$, ammonium fluoride, $NH_4F$, antimony fluoride, $SbF_5$, and other similar compounds. We prefer boric acid and ammonium borate. More preferred is boric acid.

The composition of a modified catalysts prepared as described above can range from containing 0.01 to 5.0 weight percent of the modifying element on the modified catalyst. More preferred is from 0.1 to 1.5 weight percent of the modifying element.

If the modified catalyst is to be used in an hydrocarbon upgrading process, such as hydroprocessing of middle distillates, including naphthas, kerosene, and gas oils, having components all of which boil essentially below 1000° F., the following procedure can be used. After the final heating step, the product is then treated so that the active metals on the catalysts are at least partially sulfided. This can involve several procedures. One method is to load the material into a hydroprocessing reactor, followed by contacting with sulfur containing compounds. Such contacting can be by $H_2S$ mixed with $H_2$ in concentrations ranging from 0.5 to 20 wt % and under conditions ranging from 250° to 500° C. and from 0 to 1000 psig, under a continuous flow at rates from 1 to 50 SCCM of gas per ml of catalyst and for a length of time required to complete the reaction.

Alternatively, the catalyst can be contacted with a non-aqueous solution of a reactive sulfur containing compound, such as thiols, sulfides and disulfides, including compounds such as propanethiol, butyl disulfide, or other suitable compounds. Solvents can include refinery hydrocarbon streams such as gas-oils, paraffinic liquids such as hexanes, or other suitable non-aqueous solvents. The solution, containing at least enough sulfur to stoichiometrically sulfide the catalyst is contacted with the material to be sulfided by completely filling the catalyst bed with the liquid under conditions ranging from 20° to 110° C. and from 0 to 1000 psig and from no flow to 10.0 LHSV and for a length of time required to complete the reaction. Alternatively, the liquid solution can be contacted with the material to be sulfided outside of the hydroprocessing reactor, in any suitable equipment. The sulfided catalyst is then dried in an oxygen-free environment and placed into the hydroprocessing reactor.

After the sulfiding procedure is complete, the material can be used as a catalyst for hydroprocessing and hydrocracking of refinery hydrocarbon streams, such as straight run gas oils, light cycle gas oils, heavy cycle gas oils, light or heavy naphthenates, vacuum gas oils, or any other refinery streams used in a typical hydroprocessing reaction. The use and operation of hydroprocessing and hydrocracking reactions are well known and carried on extensively in practical operation. Typical operating conditions for the catalyst of this invention may range, but are not limited to, from 200° to 600° C., from 0 to 2500 psig, from 0.2 to 10 liquid LHSV of the hydrocarbon stream based on catalyst volume, and from 1. to 40. SCCM of gas per cc of liquid, the gas consisting of recycle and $H_2$ makeup, and containing at least 60% $H_2$.

A catalyst modified according to this invention and employed for hydroprocessing, gives improvements over that of the unmodified catalyst. We have discovered that incorporating electronegative elements or compounds, such as boron, onto finished catalysts results in significantly improved activity for removal of sulfur and nitrogen impurities for hydrocarbon streams during a hydroprocessing operation. Elements include boron and fluorine, and compounds containing boron and fluorine. These are introduced onto the finished catalyst by a simple addition step. An optional heat treatment step can also be conducted.

Using this process to improve catalyst activity provides a simple, quick and inexpensive method of increasing catalyst performance at a relatively low cost. The process can be applied locally, at the site of catalyst utilization, without special equipment.

Other uses of the modified catalysts can be conceived, such as in hydrogenation processes, alkylation processes, hydrocracking processes, resid upgrading, lube oil hydroprocessing, hydrofining, or finishing processes, in either the as-modified or sulfided states. Also it is conceivably useful in selective hydrogenation, dehydrogenation, alkylation or amination reactions.

The preparation and use of materials of this invention are further described by the following Examples. Modified and unmodified catalysts were tested using the standard procedure:

Standard Testing Procedure

A volume of the catalyst to be tested is placed inside of a stainless steel tubular reactor. The material is sulfided in a 10 wt % mixture of $H_2S$ in $H_2$ at a rate of 9 SCCM of gas per $cm^3$ catalyst, at 300° C. and at atmospheric pressure for three hours. After completion of sulfiding, hydroprocessing is commenced under the following conditions: gas flow is switched to pure $H_2$ at 12 SCCM per $cm^3$ of catalyst, and a liquid flow of 2 ml/hr per $cm^3$ of catalyst, corresponding to 2 liquid-hourly space velocity, started, with the overall reactor pressure being held at 800 psi and operated at from 300° to 380° C. The change from sulfiding to operating conditions is conducted in such a manner as to ensure that the catalysts is always in a sulfur containing environment, either from sulfur containing gas or hydrocarbon feed. The hydrocarbon feed is representative of the type treatable by the modified catalysts of this invention, consisting of a light atmospheric gas oil (LAGO) having the properties described in Table 1.

After operating in this mode for a minimum of 18 hours, at which point steady-state operating conditions are reached, liquid products are removed for analysis for sulfur and nitrogen content, by X-ray fluorescence and pyrolysis, respectively. After samples are taken, temperature is changed as required to a different value, with a minimum of 18 hours allowed after each temperature change before sampling. Sulfur and nitrogen removal activities are calculated based on the feed and product sulfur and nitrogen contents, using the following equations, assuming first order reaction kinetics for both sulfur and nitrogen removal:

$$K_S = 2LHSV \ln\left(\frac{S_f}{S_p}\right)$$

$$K_N = 2LHSV \ln\left(\frac{N_f}{N_p}\right)$$

where $K_S$ is sulfur removal activity (1/hr), $K_N$ is nitrogen removal activity (1/hr), LHSV is liquid hourly space velocity (cm³ liquid/cm³ catalyst/hr), $S_f$ and $S_p$ are amounts of sulfur in the feed and product (wt %), and $N_f$ and $N_p$ are amounts of nitrogen in the feed and product (ppm).

TABLE 1

| Properties of Light Atmospheric Gas Oil | |
| --- | --- |
| Gravity | 32.0° |
| IBP | 386° F. |
| 10% | 506° F. |
| 50% | 571° F. |
| 90% | 651° F. |
| EP | 680° F. |
| sulfur, wt % | 0.7 |
| nitrogen, ppm | 490.0 |
| aromatics, wt % | 30.0 |

In order to illustrate present invention, and its advantages, the following Examples are provided.

EXAMPLE 1

This Example describes the preparation of a modified catalyst according to one method of this invention; and the results of testing the modified catalyst against the unmodified catalyst. A commercially obtainable Ni—Mo/Al₂O₃ catalyst, designated 'I', was treated with a boron containing solution. Boric acid, $H_3BO_3$ was combined with deionized water, the volume of water corresponding to the pore volume of the quantity of I treated; the solution added to I by the incipient wetness technique. The product was dried at 110° C. for three hours, and is designated 'I+B'. Sufficient quantity of boric acid was used to give a product containing 0.6 percent by weight boron.

I and I+B were tested according to the standard procedure, at 380° C. operating temperature, and the following results obtained:

| Catalyst | $K_S$ (380° C.) | $K_N$ (380° C.) |
| --- | --- | --- |
| I | 18.0 | 11.7 |
| I + B | 21.2 | 22.1 |

These results clearly indicate the advantage of adding boron to a previously formed catalyst, as both the sulfur and nitrogen removal activities are significantly enhanced by boron modification.

EXAMPLE 2

A series of 5 boron treated catalysts were prepared, using finished catalyst I and the preparation methods of Example 1. However, in addition, after boron treatment, the products were treated additionally at 500° C. for three hours in air prior to testing. The amounts of boron added and results of testing at 380° C. are listed below. Optimum improvement, through boron modification, for sulfur and nitrogen removal activities occurs for a boron loading of 0.6 wt %. These results are additionally demonstrated in FIG. 1.

| wt % B | $K_S$ (380° C.) | $K_N$ (380° C.) |
| --- | --- | --- |
| 0. | 18.0 | 11.7 |
| 0.3 | 19.3 | 13.3 |
| 0.6 | 22.1 | 20.5 |
| 1.2 | 17.7 | 19.9 |
| 1.8 | 14.3 | 8.9 |

From the results of Example 2 above, maximum improvement occurs at about 0.6 wt % boron for both sulfur and nitrogen removal activities, as compared to unmodified catalyst (0% boron).

EXAMPLE 3

Figure 2:
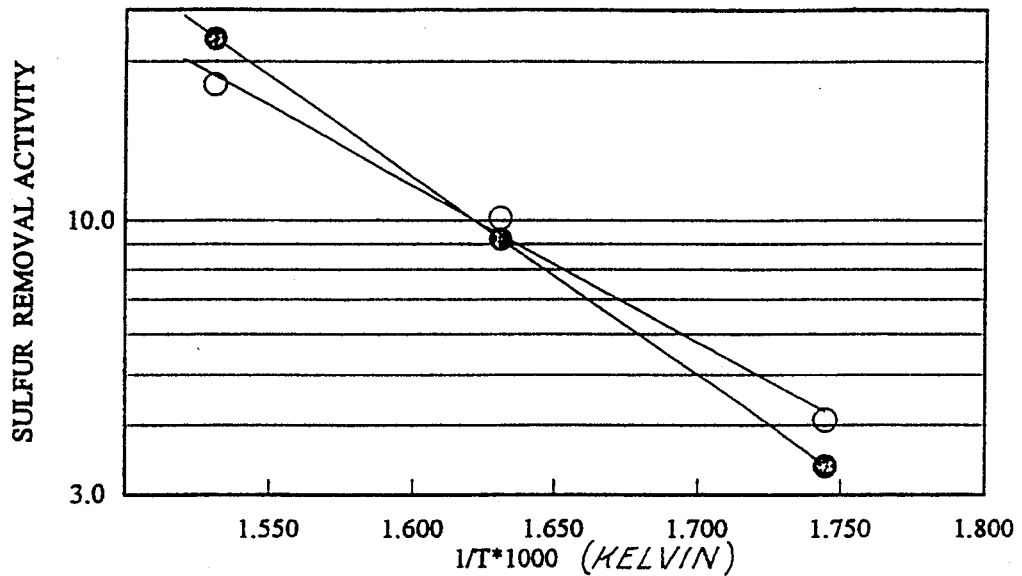
FIGS. 2 and 3 illustrate effects of operating temperature on sulfur and nitrogen removal activities on unmodified and 0.6 wt % boron modified catalysts.
Figure 3:
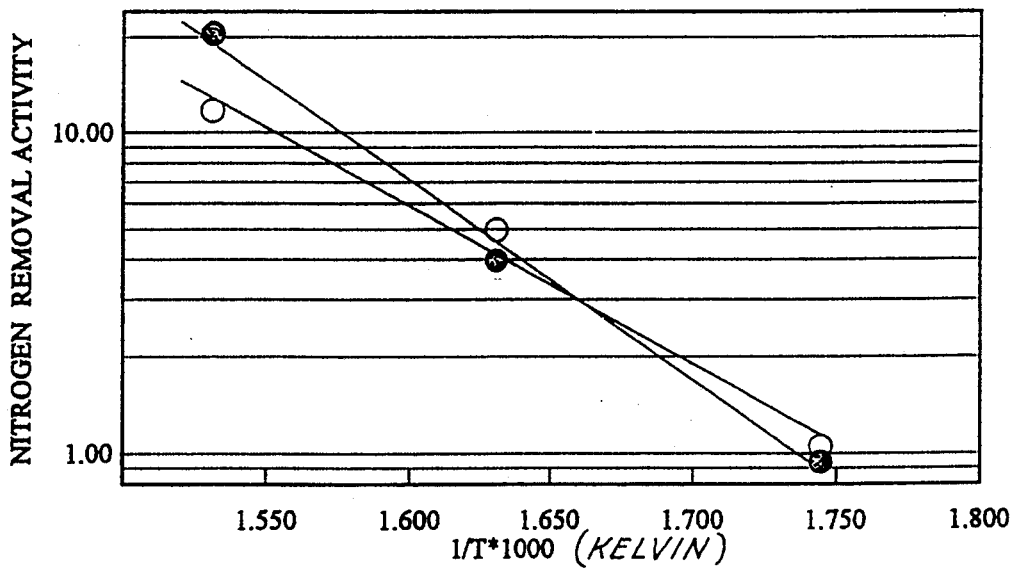

This Example shows that the advantages of modifying a catalyst according to the present invention are apparent at higher operating temperatures. A useable product, a diesel fuel having less than 0.05 wt % sulfur, can be obtained at higher temperatures, in which regime the modified catalyst is advantageous. Commercially obtainable catalyst I was modified with boron, and the catalyst and modified product tested at 300° C., 340° C. and 380° C., using the procedures of Example 1. However, after boron deposition, the modified catalyst was further treated at 500° C. for three hours in air. The results of testing are given below, and further demonstrated in FIG. 2.

| Temperature | $K_S$ | | $K_N$ | |
| --- | --- | --- | --- | --- |
| (°C.) | no B | 0.6 wt % B | no B | 0.6 wt % B |
| 300 | 4.09 | 3.38 | 1.05 | 0.94 |
| 340 | 10.1 | 9.21 | 4.95 | 3.98 |
| 380 | 18.0 | 22.1 | 11.7 | 20.5 |

From the results of Example 3, above, it is clear that at the temperature regimes needed to produce clean fuels, the boron modified catalyst has both higher sulfur and nitrogen removal activities.

EXAMPLE 4

An alternative embodiment is demonstrated, in which fluorine is used to modify finished catalysts. Two catalysts were prepared, the first, II, by depositing, in separate steps, $(NH_4)_6Mo_7O_{24}.6H_2O$ and $Ni(NO_3)_2.6H_2O$, with treatment at 500° C. for three hours in air after each step, onto an $Al_2O_3$ support, to give a catalyst having 3.3 wt % Ni and 8.3 wt % Mo. A second catalyst, III, was prepared by depositing, in a single step, $(NH_4)_6Mo_7O_{24}.6H_2O$, $Ni(NO_3)_2.6H_2O$, and $H_3PO_4$, with treatment at 500° C. for three hours in air after deposition, to give a catalyst having 3.3 wt % Ni, 8.3 wt % Mo, and 1.0 wt % P.

Catalysts II and III were modified with fluorine. Ammonium fluoride, $NH_4F$, was combined with deionized water, the volume of water corresponding to the pore volumes of the quantity of II and III treated; the solutions added to II and III by the incipient wetness technique. The products were dried at 110° C. for three hours, and then treated at 500° C. for three hours in air; designated 'II+F' and 'III+F'. Sufficient quantity of ammonium fluoride was used to give products containing 0.9 percent by weight fluorine.

II, III, II+F, and III+F were tested according to the standard procedure, at 300°, 340°, and 380° C. operating temperatures, and the following results obtained:

| Catalyst | 300° C. | | 340° C. | | 380° C. | |
|---|---|---|---|---|---|---|
| | $K_S$ | $K_N$ | $K_S$ | $K_N$ | $K_S$ | $K_N$ |
| II | 2.77 | 0.42 | 7.59 | 1.43 | 14.3 | 4.20 |
| II + F | 3.57 | 0.60 | 9.21 | 2.32 | 17.7 | 5.55 |
| III | 3.77 | 0.60 | 9.63 | 2.39 | 15.5 | 5.55 |
| III + F | 3.28 | 0.56 | 8.16 | 1.98 | 17.1 | 6.64 |

These results show that treatment of finished catalysts with fluorine results in an increase in activity, with the improvement in some cases being more apparent at higher operating temperatures.

EXAMPLE 5

This example illustrates the range of applicability of this invention. A variety of commercially obtainable finished catalysts, of differing compositions, were modified with boric acid, using the methods of Example 2. These modified catalysts were tested, according to the standard testing procedure, at 360° C., and the results given below.

| Finished Catalyst Composition: | wt. % B | $K_S$ | $K_N$ |
|---|---|---|---|
| Co—Mo/$Al_2O_3$ | 0 | 11.9 | 2.9 |
| | 0.25 | 13.3 | 3.8 |
| | 0.50 | 13.5 | 4.0 |
| | 1.00 | 10.4 | 3.4 |
| Ni—Mo—P/$Al_2O_3$ | 0 | 11.0 | 4.9 |
| | 0.25 | 11.6 | 5.9 |
| | 0.50 | 10.6 | 4.8 |
| | 1.00 | 10.0 | 4.7 |
| Co—Mo—P/$Al_2O_3$ | 0 | 10.5 | 3.7 |
| | 0.25 | 11.3 | 4.0 |
| | 0.50 | 9.0 | 3.7 |
| | 1.00 | 9.6 | 4.6 |
| Ni—W/$Al_2O_3$ | 0 | 7.8 | 3.0 |
| | 0.50 | 8.6 | 4.1 |
| | 1.00 | 7.8 | 3.4 |

Each of the commercial catalysts sulfur and nitrogen removal activities were improved through the addition of boron, although the specific response and degree of improvement varied for each case.

EXAMPLE 6

This example illustrates the use of alternative starting materials to modify finished catalysts. While not affording as much of an activity increase as a catalyst modified with boric acid, addition of these alternative boron compounds also results in an increase in either sulfur or nitrogen removal performance of the modified catalysts, as compared to the unmodified catalyst. Using the same commercially obtainable finished catalyst used in Example 1, X, quantities of tetrafluoroboric, $HBF_4$, ammonium tetraborate, $(NH_4)_2B_4O_7.4H_2O$, and boron tripropoxide, $B(OC_3H_7)_3$ were added to I. 2.54 g. of a 48% aqueous solution of $HBF_4$ was diluted to a total volume of 21 $cm^3$ with water, this solution was added to 50 g. of I, this product was dried at 110° C. and then treated in air at 500° C. for 3 hours. This product is designated '6A'. Similarly, 0.92 g. of $(NH_4)_2B_4O_7.4H_2O$ was mixed with 21.8 g. of water and 50 g. of X, and then dried at 110° C. and then treated in air at 500° C. for 3 hours. This product is designated '6B'. Similarly, 2.61 g. of $B(OC_3H_7)_3$ was diluted to a total volume of 21 $cm^3$ with ethanol, this solution was added to 50 g. of I, conducted in an inert atmosphere, and then dried at 110° C. and then treated in air at 500° C. for 3 hours. This product is designated '6C'.

I, 6A, 6B and 6C were tested by the same procedure as Example 1, but at a reaction temperature of 360° C. The following results were obtained:

| Catalyst | boron precursor | 360° C. | |
|---|---|---|---|
| | | $K_S$ | $K_N$ |
| I | none | 11.3 | 4.3 |
| 6A | $HBF_4$ | 9.7 | 4.9 |
| 6B | $(NH_4)_2B_4O_7 \cdot 4H_2O$ | 11.6 | 5.3 |
| 6C | $B(OC_3H_7)_3$ | 9.8 | 4.8 |

We claim:

1. A method of increasing the activity of a finished catalyst for the hydroprocessing of hydrocarbons consisting essentially of active metals from the group consisting of VIB, VIIB, and VIII deposited on a porous refractory oxide support from the group consisting of alumina, silica, zeolites, titanias, zirconias, carbon and mixtures thereof, which consists essentially of:
   a) applying to a finished catalyst a modifier selected from the group consisting of elements of boron, fluoride, tin, arsenic, antimony, bismuth, chlorine, bromide, iodide, lithium, sodium, potassium, rubidium cesium, and a boron-containing compound, dissolved in a solvent selected from the group consisting of water, hydrogen peroxide solutions and acetone, wherein the volume of said solvent corresponds to the pore volume capacity of said finished catalyst to provide a modified finished catalyst,
   b) drying said modified, finished catalyst to remove all free solvent from said catalyst and produce a modified, dried finished catalyst,
   c) wherein the catalyst contains from about 0.01 to about 5 wt % of the modifier,
   d) heating said modified, dried, finished catalyst at a temperature of about 120° C. to about 1000° C. at a rate of 1°–20° C. per minute and holding said dried finished catalyst at a temperature of about 120° C. to about 1000° C. up to 48 hours to provide a finished catalyst having increased activity over the finished catalyst prior to modification; and
   e) recovering said modified, dried finished catalyst having increased activity.

2. The method of claim 1 wherein the modifier is selected from the group consisting of boron or a boron-containing compound.

3. The method of claim 2 wherein the modifier is a boron containing compound selected from the group consisting of hydrated acids, ammoniacal salts, halides and nitrates of boron.

4. The method of claim 3 wherein the modifier is selected from the group consisting of boric acid, boron fluoride, fluoroboric acid and boron fluorine hydrocarbon compounds of the general formula $B_nF_mR_o$ or the oxygenated equivalents of n, m and o are positive integers, and n and o have values of at least 1 and m is zero or greater and wherein R is a combination of hydrocarbons from the group consisting of ethers, paraffins, aromatics, other ring compounds and amines.

5. The method of claim 4 wherein the boron compound is of the general formula $B_nF_mR_o$ and is selected from the group consisting of boron fluoride ether, $BF_3(C_2H_5)_2O$, boron tripoxide, $B(OC_3H_2)_3$, triethylboron, $(C_2H_5)_3B$, ammonium fluoride, $NH_4F$ and antimony fluoride, $SbF_5$.

6. The method of claim 2 wherein the modifier is selected from the group consisting of boric acid and ammonium borate.

* * * * *